United States Patent
Herr

(10) Patent No.: US 7,458,777 B2
(45) Date of Patent: Dec. 2, 2008

(54) WIND TURBINE ROTOR ASSEMBLY AND BLADE HAVING ACOUSTIC FLAP

(75) Inventor: Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 11/232,626

(22) Filed: Sep. 22, 2005

(65) Prior Publication Data
US 2007/0065290 A1   Mar. 22, 2007

(51) Int. Cl.
*F03D 11/00* (2006.01)

(52) U.S. Cl. ............ 416/23; 416/146 R; 416/228; 415/119

(58) Field of Classification Search ............ 416/23, 416/146 R, 228, 240; 415/4.3, 4.5, 119, 415/908; 290/44, 55
See application file for complete search history.

(56) References Cited

U.S. PATENT DOCUMENTS

| | | | | |
|---|---|---|---|---|
| 2,396,811 A | * | 3/1946 | Bathras | 416/235 |
| 2,450,440 A | * | 10/1948 | Mills | 416/223 R |
| 4,618,313 A | * | 10/1986 | Mosiewicz | 416/237 |
| 4,892,460 A | * | 1/1990 | Volk | 416/62 |
| 5,088,665 A | | 2/1992 | Vijgen et al. | |
| 5,328,329 A | * | 7/1994 | Monroe | 416/62 |
| 5,533,865 A | | 7/1996 | Dassen et al. | |
| 6,033,180 A | | 3/2000 | Machida | |
| 6,238,185 B1 | | 5/2001 | Horng | |
| 6,254,342 B1 | | 7/2001 | Fujinaka et al. | |
| 6,729,846 B1 | | 5/2004 | Wobben | |
| 6,830,436 B2 | | 12/2004 | Shibata et al. | |
| 6,856,042 B1 | | 2/2005 | Kubota | |
| 6,890,152 B1 | | 5/2005 | Thisted | |
| 6,913,435 B2 | | 7/2005 | Seki | |
| 6,939,108 B2 | | 9/2005 | Boyd | |
| 7,059,833 B2 | * | 6/2006 | Stiesdal et al. | 416/41 |

FOREIGN PATENT DOCUMENTS

DE    103 40 978 A1    4/2005
EP    1 314 885 A1    5/2003

OTHER PUBLICATIONS

European Search Report, Application No. 06 25 4831.8 (Jan. 11, 2007).

* cited by examiner

*Primary Examiner*—Ninh H Nguyen
(74) *Attorney, Agent, or Firm*—Armstrong Teasdale LLP

(57) ABSTRACT

A wind turbine includes a rotor assembly having at least one blade with a blade body defining a leading edge and a trailing edge and adapted for movement in response to a wind flow over the body to produce electricity. A rigid acoustic flap extends outward from the trailing edge, and a distal end of the acoustic flap is substantially smooth and continuous. The flap reduces acoustic noise generated by the blade in use.

20 Claims, 3 Drawing Sheets

WIND TURBINE ROTOR ASSEMBLY AND BLADE HAVING ACOUSTIC FLAP

BACKGROUND OF THE INVENTION

This invention relates generally to turbines, and more particularly, to turbine blades for wind turbines.

Generation of electricity by wind or water power without using fossil fuels is desirable to produce electrical power in a more environmentally friendly manner. Wind turbines are known that convert rotational movement of turbine blades to electricity as wind causes the blades to rotate.

It has been found, however, that wind turbines can produce noise in operation that can be a nuisance in some installations. Especially when wind turbines are placed in close relation to populated areas, aerodynamic noise emissions from the turbines in use may be unacceptable.

A variety of efforts have been made to reduce aerodynamic noise of turbine blades in use. For example, U.S. Pat. No. 6,830,436 describes a serrated rear member that is attachable to a main blade body to reduce noise. U.S. Pat. No. 6,729,846 describes turbine blades having a roughened surface treatment. U.S. Pat. No. 5,533,865 describes irregularly formed rear edges of turbine blades to address noise issues.

While such efforts may have achieved some success in reducing aerodynamic noise in certain installations, a less complicated and lower cost solution to wind turbine noise is desired.

BRIEF DESCRIPTION OF THE INVENTION

In one aspect, a blade for a wind turbine is provided. The blade includes a blade body defining a leading edge and a trailing edge and adapted for movement in response to a wind flow over the body to produce electricity, and a rigid acoustic flap extending outward from the trailing edge, wherein a distal end of the acoustic flap is substantially smooth and continuous.

In another aspect, a rotor assembly for a wind turbine is provided. The rotor comprises a plurality of blades rotatable about an axis in response to wind impinging upon the blades. At least one of the blades includes a blade body defining a leading edge, a trailing edge and a chord distance therebetween. A rigid acoustic flap is secured to the blade body and extends outward from the trailing edge for a specified fraction of the chord distance, thereby reducing trailing edge noise broadband and tonality as the blade is rotated.

In still another aspect, a wind turbine is provided. The turbine includes a rotatable shaft coupled to a generator, and at least one blade coupled to the shaft and movable by wind for the generation of electricity. The at least one blade comprises a body defining a leading edge, a trailing edge and a chord distance therebetween. The body has a high pressure side and a low pressure side, and a rigid acoustic flap is secured to the high pressure side and extends outward from the trailing edge to a smooth distal end, thereby reducing trailing edge noise broadband and tonality.

DETAILED DESCRIPTION OF THE INVENTION

Figure 1:
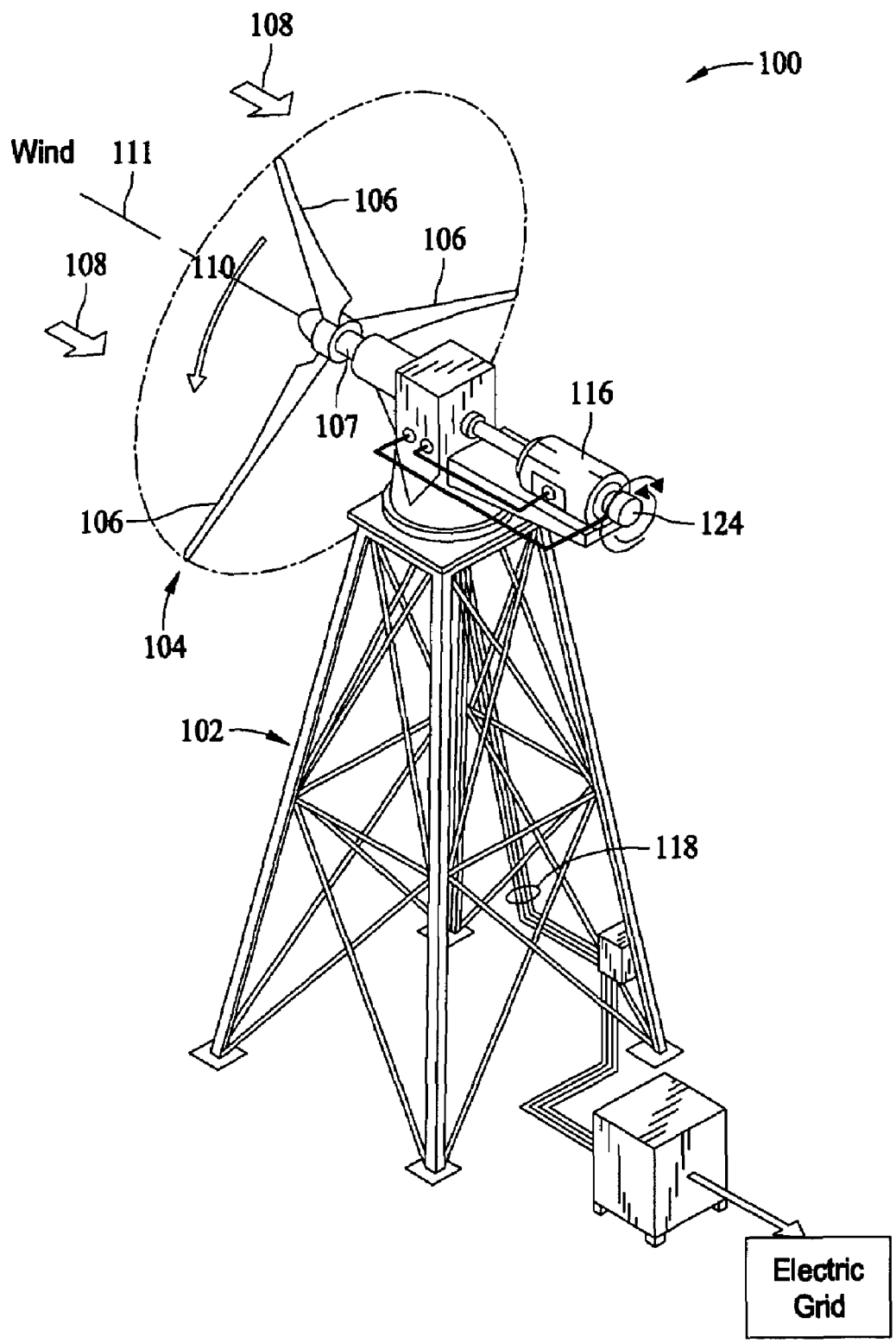
FIG. 1 is a perspective view of an exemplary embodiment of a wind turbine.

FIG. 1 is a perspective view of an exemplary embodiment of a wind turbine 100. In one embodiment, the wind turbine 100 mounted on a pedestal 102, and a rotor assembly 104 is mounted to the upper portion of the pedestal 102. The rotor assembly 104 has one or more blades 106 connected to a shaft 107. When wind blows, for example from the direction 108, the blades 106 and the shaft 107 rotate in the direction of arrow 110 about an axis 111 in response to wind impinging upon the blades 106. However, in other embodiments, the rotational direction may be in the opposite direction from the direction of arrow 110 with an equivalent but opposite effect. Furthermore, other wind turbine configurations, such as vertical axis wind turbine configurations, may be used with equal utility.

The wind, acting on the blades 106, supplies a torque to the shaft 107 in the rotational direction 110 and the amount of supplied torque is a function of the wind speed and rotor speed. The rotating shaft 107 is connected to an electrical generator 116 to provide electrical power on an output cable 118.

As noted above, the blades 106 of the turbine 100 can in some conditions produce acoustic noise in use that is undesirable in certain installations, such as when the turbine 100 is located in close proximity to a populated area, and particularly to residential areas. Such problems can be compounded when multiple blades 106 are producing noise, and when more than one turbine 100 is located in the same general geographic area. To overcome such issues, one or more of the blades 106 includes an acoustic flap (not shown in FIG. 1 but described below) that reduces and mitigates acoustic noise to more acceptable levels in use. Advantageously, the noise can be reduced, using the acoustic flaps, at a lower cost than conventional, noise reduction techniques.

Figure 2:
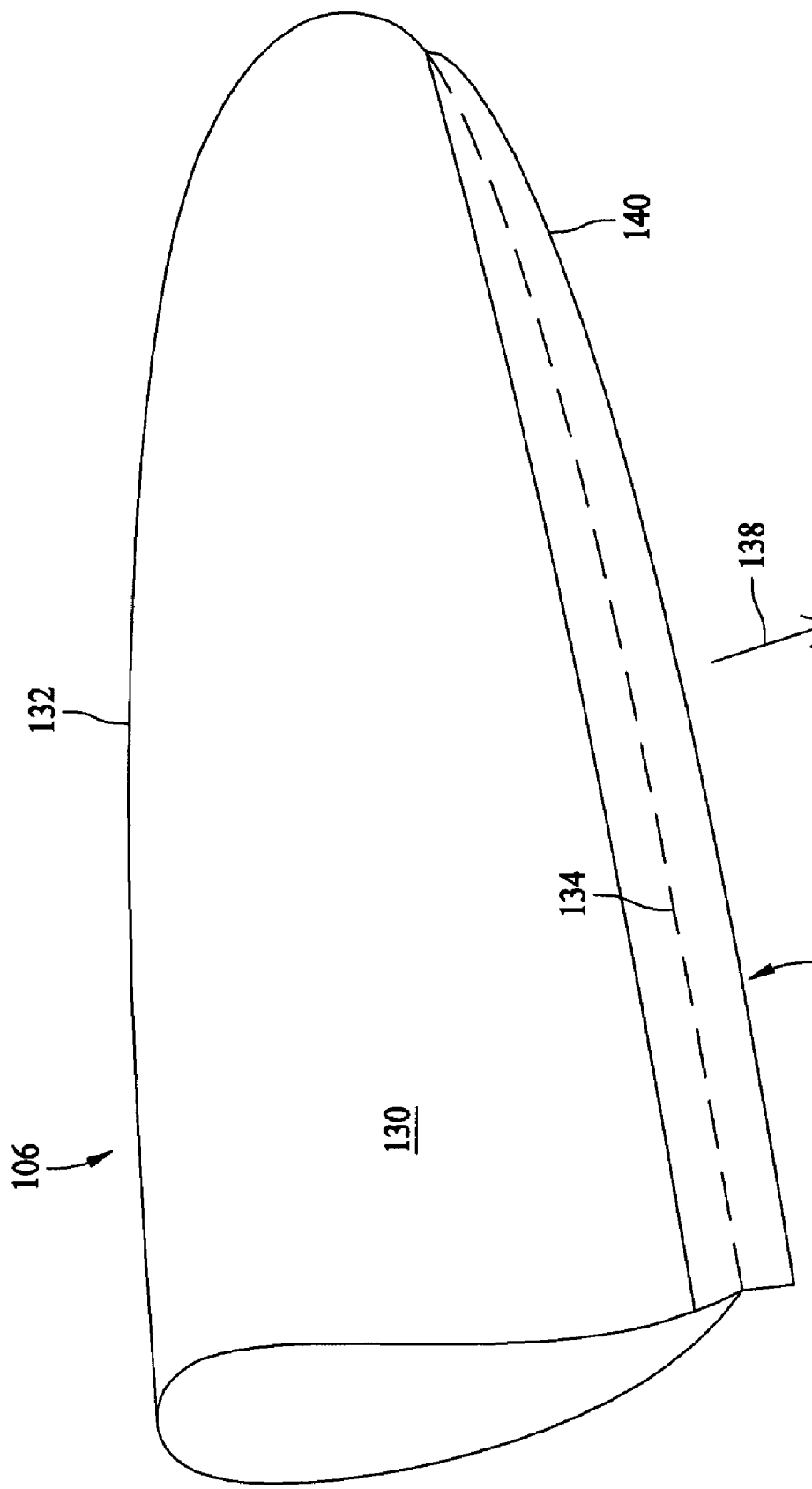
FIG. 2 is a perspective view of a turbine blade for the turbine shown in FIG. 1.

FIG. 2 is a perspective view of the turbine blade 106 for the turbine shown in FIG. 1. The blade 106 includes a body 130 defining a leading edge 132 and a trailing edge 134 (shown in phantom in FIG. 2). The body 130 is shaped and adapted for movement in response to a wind flow over the body 130 so that, when used in the rotor assembly 104 of, for example, the turbine 100 shown in FIG. 1, the movement of the blade body 130 may produce electricity without the use of fossil fuels.

To address acoustic noise generation issues of the blade 106 in operation, a substantially rigid acoustic flap 136 is secured to the blade body 130 and extends outward and away from the trailing edge 134 in a direction of arrow 138. A distal end 140 of the acoustic flap 136 is spaced from the trailing edge 134 and in an exemplary embodiment the distal end 140 is substantially smooth and continuous. That is, the distal end 140 of the acoustic flap 136 does not include serrations or saw teeth forming sharp or discontinuous edges of the flap 136, but rather the distal end 140 of the acoustic flap 136 extends generally uniformly parallel to the trailing edge 134 of the blade body 130 in a smooth and uninterrupted manner. Stated another way, the contour of the distal end 140 of the acoustic flap 136 approximately matches the contour or geometry of the blade body trailing edge 134, but the distal end 140 of the flap 136 is spaced a predetermined distance from the trailing edge 134 of the blade body 130 so that the flap 136 extends beyond the trailing edge 134 while maintaining approximately the same shape and geometry of the trailing edge 134. Compared to conventional turbine blades, the blade 106 having the flap 136 is believed to reduce trailing edge noise broadband and tonality as the blade 106 is rotated.

In one embodiment, the acoustic flap 136 is separately provided and fabricated from the blade body 130, and in one embodiment the flap 136 is fabricated from a thin sheet or plate of rigid material, such as metal, fiber reinforced plastics or rigid plastic materials, and the like having sufficient structural strength to avoid bending and deflection of the flap 136 when the blade 106 is subjected to applied forces, such as wind loading force and dynamic forces and vibration encountered by the blade 106 as the blade 106 is rotated. It is understood, however, that other materials may likewise be employed in lieu of metal and plastic materials, provided that such materials exhibit sufficient rigidity to withstand applied forces in use when the blade 106 is used in a wind turbine application. Thin sheet or plate materials suitable for the flaps 136 may be acquired from a variety of manufacturers at relatively low cost, and the flaps 136 may be cut, stamped, or otherwise separated from a larger sheet of material in a relatively simple manner with minimal cost and machining.

Figure 3:
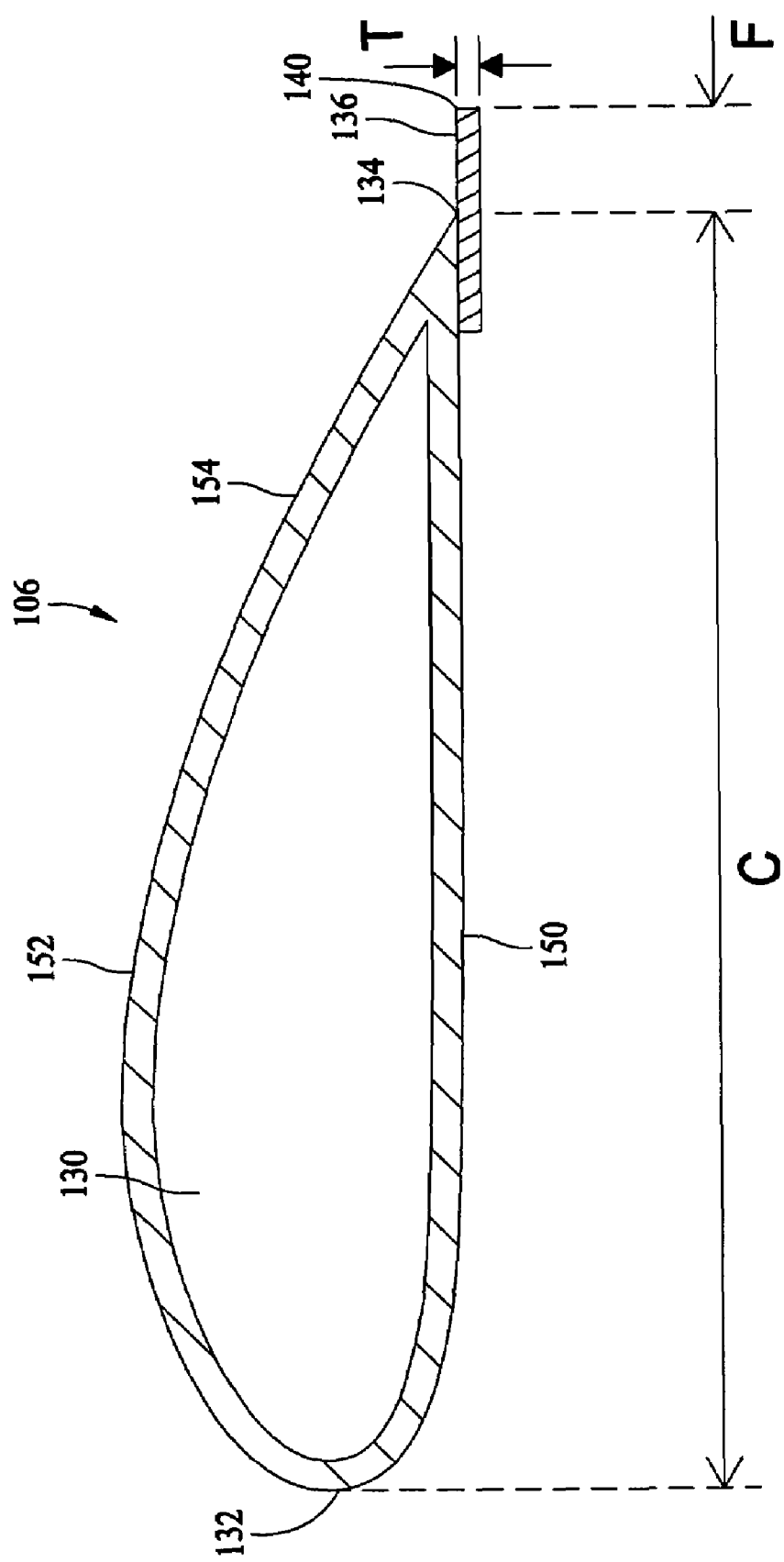
FIG. 3 is a cross sectional view of the turbine blade shown in FIG. 2.

FIG. 3 is a cross sectional view of the turbine blade 106 including a high pressure side 150 and a low pressure side 152 extending between the leading edge 132 and the trailing edge 134 of the blade body 130. While the body 130 shown in FIG. 3 is hollow in cross section, it is recognized that hollow solid bodies may alternatively be used in another embodiment.

Referring now to FIG. 3, the blade body defines a chord distance or dimension C between the leading edge 132 and the trailing edge 134, and the distal end 140 of the acoustic flap 136 extends outwardly and away from the trailing edge 134 for a distance F that is a specified fraction of the chord distance C. In an exemplary embodiment, F is about 3% or less of the chord distance C.

Also, in an exemplary embodiment, the acoustic flap 136 has a thickness T, measured between the major surfaces of the flap 136 that is much less than a thickness of the blade trailing edge 134. In one embodiment, the flap thickness T may be up to about 0.3% of the chord distance C to achieve noise reduction without negatively impacting the efficiency of the blades 106 to produce electricity. While exemplary dimensions are provided, it is understood that such dimensions are for illustrative purposes only, and that greater or lesser dimensions for T and F may be employed in other embodiments.

The acoustic flap 136 in one embodiment is secured to an outer surface 154 of the blade body 130 is and substantially flush with the outer surface 154 to avoid disturbance of airflow over the pressure side 150 when the flap 136 is attached to the blade 106. In a further embodiment, a small recess or groove (not shown) could be provided in the blade outer surface 154 to receive the flap 136 so that an outer surface of the flap 136 is substantially flush and continuous with the outer surface 154 of the blade body 130. The flap 136 is secured, fixed or bonded to the outer surface 154 with, for example, a known adhesive, tape or other affixation methods known in the art that securely maintain the flap 136 to the blade body outer surface 154. The flap 136 may be mounted to the blade body 130 mechanically, chemically, or with a combination of mechanical and chemical bonding methods. In an alternative embodiment, the flap 136 may be integrally or monolithically formed into the blade body 130 if desired.

The flap 136 is extended from, affixed to or secured to the blade body 130, for example, adjacent the trailing edge 134 on one side of the blade body 130, namely the pressure side 150 of the blade body 130 in one exemplary embodiment. Rivets, screws or other fasteners that would project upwardly from the outer surface 154 of the blade body 130 and disrupt airflow across or above the blade are preferably avoided. Also, the acoustic flap 136 is uniformly bonded to the outer surface 154 along substantially the entire length of the blade trailing edge 134, thereby avoiding air gaps between the flap 136 and the blade outer surface 154 that could cause the flap 136 to separate from the blade body 130, or air gaps that could cause airflow disturbances that could impair the efficiency of the wind turbine 100 (FIG. 1) or produce acoustic noise in operation.

It is believed that a thin acoustic flap 136 applied to the pressure side 150 of the trailing-edge 134 of the blade 106 can decrease noise emission or avoid a tonality in use, and that noise reduction may be realized using the acoustic flap 136. In particular, for blade bodies 130 having a relatively thick trailing edge 134, such as about 3 mm in an exemplary embodiment, the acoustic flap 136 has been found to remove negative effects of a thick trailing edge. In general, and absent the acoustic flap 136, as the thickness of the trailing edge 134 increases, so does the resultant acoustic noise of the blade in use. The acoustic flap 136, however, has been found to mitigate noise when thicker trailing edges are employed.

A generally low cost and straightforward solution to noise issues of turbine blades in use is provided by virtue of the acoustic flap 136, and the flap 136 may be rather easily applied and retrofitted to existing turbine blades as desired. Additionally, if the flaps 136 are damaged, they may be rather easily replaced. A versatile, noise reduction feature is therefore provided that may be used in varying types of blades as desired. The acoustic flaps 136 may be used in combination with other known noise reducing features if desired, including but not limited to surface treatments to the blade body, to further reduce trailing edge noise broadband and tonality of the turbine blades in use. Considered over a number of blades and a number of turbines, substantial noise reduction may be achieved.

While the invention has been described in terms of various specific embodiments, those skilled in the art will recognize that the invention can be practiced with modification within the spirit and scope of the claims.

What is claimed is:

1. A blade for a wind turbine, said blade comprising:
a blade body defining a leading edge and a trailing edge and adapted for movement in response to a wind flow over the body, the body further defining a high pressure side and a low pressure side joined along the trailing edge; and
a rigid acoustic flap comprising a first substantially planar surface, a second substantially planar surface, and a substantially smooth distal end, the flap having a substantially constant thickness measured between the first and second surfaces, the flap coupled to and extending outward from at least one of the high pressure side and the low pressure side and extending along the body trailing edge, a first portion of the first planar surface extending along the respective side, a second portion of the first planar surface extending outward from the trailing edge substantially parallel to the respective side, said second substantially planar surface extending outwardly from one of the high pressure side and low pressure side a distance approximately equal to the flap thickness.

2. The blade of claim 1 wherein the acoustic flap is fabricated from one of a plastic material and a metallic material.

3. The blade of claim 1 wherein the blade body defines a chord distance between the leading edge and the trailing edge, and a distal end of the acoustic flap extends for a distance from the trailing edge of about 3% of the chord distance.

4. The blade of claim I wherein the blade body defines a chord distance between the leading edge and the trailing edge, the acoustic flap having a thickness about 0.3% or less of the chord distance.

5. The blade of claim 1 wherein the body includes an outer surface, the acoustic flap secured to and substantially flush with the outer surface.

6. The blade of claim 1 wherein the acoustic flap is secured to the high pressure side.

7. The blade of claim 1 wherein the acoustic flap is secured adjacent the trailing edge on the blade body.

8. A rotor assembly for a wind turbine, said rotor assembly comprising:
   a plurality of blades rotatable about an axis in response to wind impinging upon the blades, wherein at least one of the blades comprises:
   a blade body defining a leading edge, a trailing edge and a chord distance therebetween, the body further defining a high pressure side and a low pressure side joined along the trailing edge; and
   a rigid acoustic flap comprising a first substantially planar surface, a second substantially planar surface, the flap having a substantially constant thickness measured between the first and second surfaces, the flap coupled to and extending outward from at least one of the high pressure side and the low pressure side and extending along the body trailing edge, a first portion of the first planar surface extending along the respective side, a second portion of the first planar surface extending outward from the trailing edge substantially parallel to the respective side, said second substantially planar surface extending outwardly from one of the high pressure side and low pressure side a distance approximately equal to the flap thickness.

9. The rotor assembly of claim 8 wherein a distal end of the acoustic flap is substantially smooth.

10. The rotor assembly of claim 9 wherein the acoustic flap is formed from a sheet of material having a thickness of about 0.3% or less of the chord distance.

11. The rotor assembly of claim 9 wherein the trailing edge includes an outer surface, the acoustic flap secured in a substantially flush position with respect to the outer surface.

12. The rotor assembly of claim 9 wherein the acoustic flap is secured to the high pressure side adjacent the trailing edge.

13. The rotor assembly of claim 9 wherein the acoustic flap is secured adjacent the trailing edge on the blade body.

14. The rotor assembly of claim 8 wherein a distal end of the acoustic flap extends for a distance from the trailing edge of about 3% of the chord distance.

15. A wind turbine comprising:
   a rotatable shaft coupled to a generator; and at least one blade coupled to the shaft and movable by wind for the generation of electricity, the at least one blade comprising:
   a body defining a leading edge, a trailing edge and a chord distance therebetween, the body having a high pressure side and a low pressure side joined along the trailing edge; and
   a rigid acoustic flap comprising a first substantially planar surface, a second substantially planar surface, the flap having a substantially constant thickness measured between the first and second surfaces, the flap coupled to and extending outward from at least one of the high pressure side and the low pressure side and extending along the body trailing edge, a first portion of the first planar surface extending along the respective side, a second portion of the first planar surface extending outward from the trailing edge substantially parallel to the respective side, said second substantially planar surface extending outwardly from one of the high pressure side and low pressure side a distance approximately equal to the flap thickness.

16. The turbine of claim 15 wherein the distal end of the acoustic flap extends for a distance from the trailing edge of about 3% of the chord distance.

17. The turbine of claim 15 wherein to acoustic flap is formed from a sheet of material having a thickness of about 0.3% or less of the chord distance.

18. The turbine of claim 15 wherein to trailing edge includes an outer surface, the acoustic flap secured in a substantially flush position with respect to the outer surface.

19. The turbine of claim 15 wherein to acoustic flap is secured adjacent the trailing edge on the blade body.

20. The turbine of claim 15 wherein the acoustic flap is fabricated from one of a metallic material and a plastic material.

* * * * *